US011485587B2

(12) United States Patent
Becher et al.

(10) Patent No.: US 11,485,587 B2
(45) Date of Patent: Nov. 1, 2022

(54) METHOD FOR THE SORTING OF OBJECTS AND SORTING INSTALLATION

(71) Applicants: SIEMENS AKTIENGESELLSCHAFT, Munich (DE); DEUTSCHE POST AG, Bonn (DE)

(72) Inventors: Joern Becher, Mainz (DE); Bernd Hartmann, Grafschaft-Leimersdorf (DE); Reinhard Klink, Stockach (DE)

(73) Assignees: Siemens Aktiengesellschaft, Munich (DE); Deutsche Post AG, Bonn (DE)

( * ) Notice: Subject to any disclaimer, the term of this patent is extended or adjusted under 35 U.S.C. 154(b) by 558 days.

(21) Appl. No.: 16/573,231

(22) Filed: Sep. 17, 2019

(65) Prior Publication Data
US 2020/0087080 A1   Mar. 19, 2020

(30) Foreign Application Priority Data
Sep. 17, 2018 (EP) .................................. 18194802

(51) Int. Cl.
*B65G 47/48* (2006.01)
*B65G 41/00* (2006.01)
(Continued)

(52) U.S. Cl.
CPC ................ *B65G 47/48* (2013.01); *B07C 3/08* (2013.01); *B65G 41/002* (2013.01); *B65G 47/24* (2013.01);
(Continued)

(58) Field of Classification Search
CPC ............ B65G 47/42–506; B65G 47/57; B65G 47/684; B65G 47/94–967;
(Continued)

(56) References Cited

U.S. PATENT DOCUMENTS 2,728,466 A * 12/1955 Postlewaite .......... B65G 47/503
198/367
5,638,938 A * 6/1997 Lazzarotti ................ B07C 1/02
198/444

(Continued)

FOREIGN PATENT DOCUMENTS

CN  1165058 A   11/1997
CN  102844251 A  12/2012
(Continued)

*Primary Examiner* — Gene O Crawford
*Assistant Examiner* — Keith R Campbell
(74) *Attorney, Agent, or Firm* — Laurence A. Greenberg; Werner H. Stemer; Ralph E. Locher

(57) ABSTRACT

A method to sort objects in a sorting installation. The objects are conveyed on a sorter of the sorting installation. In a first distribution pass a few of the objects conveyed on the sorter are brought by the sorter into retrieval end stations of the sorting installation and others of the objects conveyed on the sorter are brought by the sorter into a collection end station of the sorting installation and, with a transport facility of the sorting installation, objects are automatically transported away from the collection end station and automatically brought back to the sorter. The objects brought back from the collection end station to the sorter by the transport facility are brought by the sorter into one of the end stations in a second distribution pass.

14 Claims, 4 Drawing Sheets

(51) Int. Cl.
  *B65G 47/24* (2006.01)
  *B65G 47/44* (2006.01)
  *B65G 47/57* (2006.01)
  *B07C 3/08* (2006.01)

(52) U.S. Cl.
  CPC ............ *B65G 47/44* (2013.01); *B65G 47/57* (2013.01); *B65G 2201/02* (2013.01); *B65G 2203/0208* (2013.01); *B65G 2207/46* (2013.01); *B65G 2811/0621* (2013.01)

(58) Field of Classification Search
  CPC ........ B65G 2201/02; B65G 2203/0208; B65G 2207/46; B65G 2811/0621; B07C 3/008; B07C 3/02; B07C 3/08
  See application file for complete search history.

(56) References Cited

U.S. PATENT DOCUMENTS

| | | | | |
|---|---|---|---|---|
| 5,901,855 A * | 5/1999 | Uno | ................... | B07C 3/02 |
| | | | | 235/375 |
| 6,076,683 A * | 6/2000 | Okada | ................... | B07C 1/00 |
| | | | | 209/583 |
| 7,128,197 B2 * | 10/2006 | Haan | ................... | B65G 43/08 |
| | | | | 198/347.4 |
| 7,909,155 B2 * | 3/2011 | Lupton | ................... | B65G 43/08 |
| | | | | 198/448 |
| 9,278,809 B2 * | 3/2016 | Lykkegaard | ............ | B65G 47/26 |
| 10,870,543 B1 * | 12/2020 | Dwivedi | ................. | B65G 47/44 |
| 11,001,454 B2 * | 5/2021 | Becher | ............... | B65G 47/5104 |
| 11,203,493 B2 * | 12/2021 | Berg | ................... | B65G 43/08 |
| 2007/0090028 A1 | 4/2007 | Varney | | |
| 2012/0222992 A1 | 9/2012 | Girodet et al. | | |
| 2013/0031876 A1 | 2/2013 | Fritzsche | | |
| 2020/0086354 A1 * | 3/2020 | Becher | ................... | B07C 3/08 |

FOREIGN PATENT DOCUMENTS

| | | |
|---|---|---|
| CN | 103037986 A | 4/2013 |
| CN | 107918802 A | 4/2018 |
| DE | 19709232 | 11/1997 |
| DE | 102016015061.0 | 6/2018 |
| WO | WO 9912834 A1 | 3/1999 |

\* cited by examiner

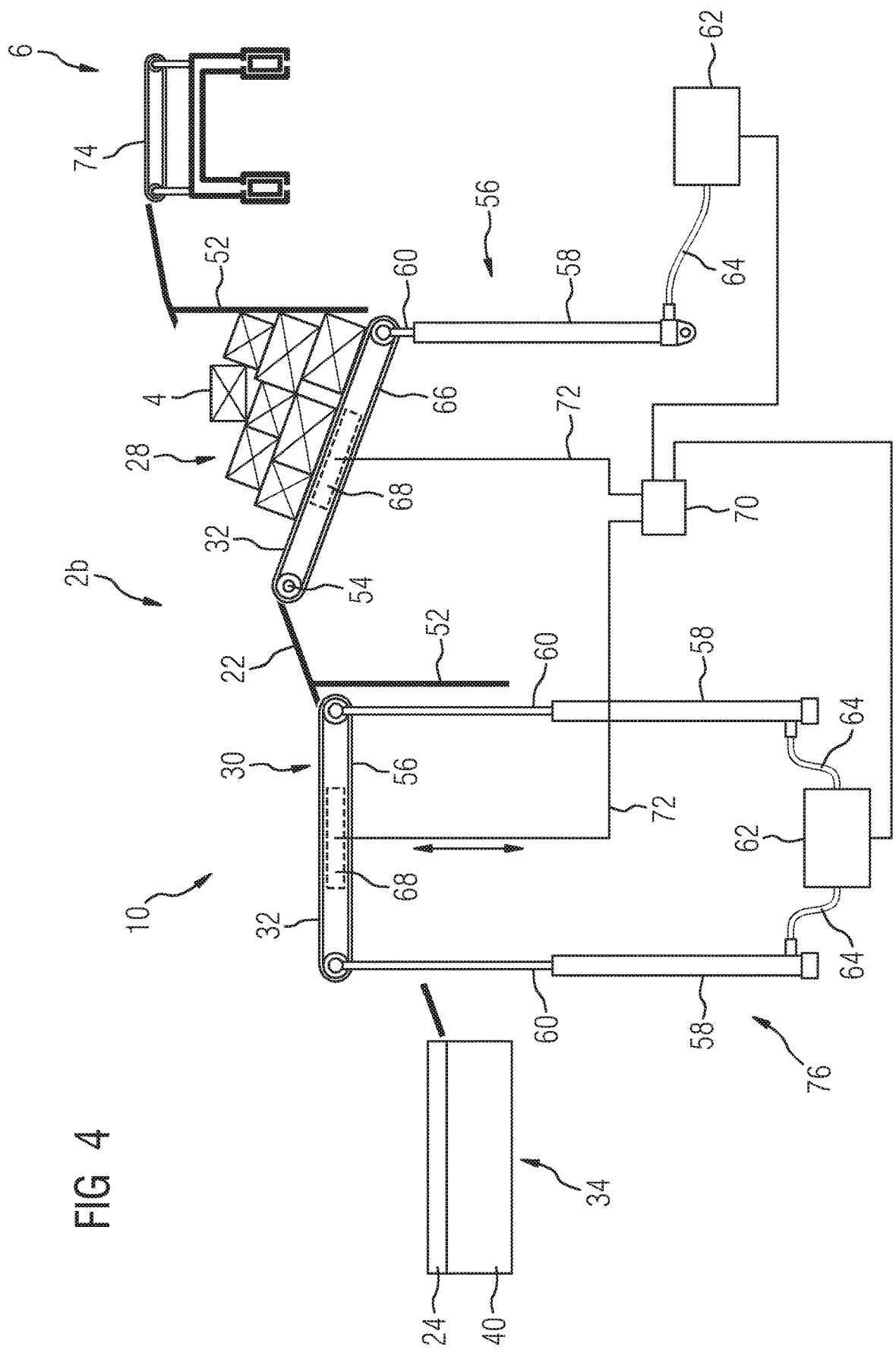

METHOD FOR THE SORTING OF OBJECTS AND SORTING INSTALLATION

CROSS-REFERENCE TO RELATED APPLICATION

This application claims the priority, under 35 U.S.C. § 119, of European application EP 18194802.7, filed Sep. 17, 2018; the prior application is herewith incorporated by reference in its entirety.

BACKGROUND OF THE INVENTION

Field of the Invention

The invention relates to a method for the sorting of objects in a sorting installation. The method further relates to a sorting installation for the sorting of objects.

Sorting installations, as are present in parcel handling and dispatch systems for example, usually comprise one or more sorters and also a number of end stations. In the end stations of a sorting installation the objects distributed by a sorter to the end stations are stored until the next processing step, such as for example the loading of objects into rolling containers for their further transport.

Objects that are stored temporarily in the same end station are typically intended for the same destination (region), such as for example for a predetermined parcel handling/dispatch center or for a predetermined distribution region, wherein the objects can basically be distributed to the end stations in accordance with any given criterion other than their respective destination (region). Within an end station the objects are usually distributed chaotically. In the respective end station there is thus in particular no fine distribution of the objects in accordance with further criteria (such as for example the destination addresses and/or the dimensions of the objects).

As a result of ever-increasing volumes of objects that are to be processed by sorting installations, there is basically an increasing need for distributing the objects in a more refined way in a sorting installation, in particular for sorting the objects according to a greater number of destinations/destination regions. However the need for end stations can exceed the number of available end stations of a sorting installation. One approach to solving this problem makes provision for installing additional end stations in the sorting installation, so that the objects can be distributed to a greater number of end stations.

The number of end stations of a sorting installation able to be realized depends inter alia on the space available as well as on the length of the respective sorter. Mostly the number of realizable end stations is already exhausted, so that the installation of additional end stations is not possible.

SUMMARY OF THE INVENTION

An object of the invention, in a sorting installation for the sorting of objects, is to make possible a fine distribution of the objects, in particular according to destination regions, in a favorable manner as regards outlay.

This object is achieved in accordance with the invention by a method according to the independent method claim as well as by a sorting installation according to independent sorting installation claim.

Preferred embodiments of the invention are specified in the further claims as well as in the description given below.

In the inventive method for the sorting of objects in a sorting installation objects are conveyed on a sorter of the sorting installation. Furthermore, in a first distribution pass a few of the objects conveyed on the sorter are brought from the sorter into retrieval end stations of the sorting installation and other objects conveyed on the sorter are brought into a collection end station of the sorting installation. Moreover objects are automatically transported away from the collection end station and automatically brought back to the sorter by a transport facility of the sorting installation, wherein the objects brought back by the transport facility from the collection end station to the sorter are brought into one of the end stations by the sorter in a second distribution pass in each case.

The invention is based on the following knowledge: If N end stations are available for a fine distribution of objects, but a fine distribution of the objects into M groups is desired, wherein M>N, then such a fine distribution is able to be realized (without the installation of additional end stations into the sorting installation) if the objects are distributed to the end stations in a number of distribution passes. In other words, the desired fine distribution is able to be realized (without the installation of additional end stations into the sorting installation) if one and the same end station is used multiple times for sorting the objects. In the first distribution pass a few of the objects can be distributed by means of the sorter to a few of the N end stations (for example to N−1 end stations), while at least one of the end stations (referred to here as the collection end station) is used for intermediate storage of the remaining objects before these objects are brought back to the sorter and distributed by the sorter to a few or to all of the end stations in the second distribution pass.

The fact that objects are automatically transported away from the collection end station with the aid of the transport facility and are brought back automatically to the sorter means that the manual effort for transporting away and bringing back these objects is not required. In particular the process of manually bringing back to the sorter in transport containers, such as for example rolling containers, the objects brought into the collection end station can be dispensed with. The omission of the manual handling effort of transportation on the transport facility moreover enables process times for the sorting of the objects to be reduced.

In the sense of the present invention "objects" involve items that can be sorted, which are to be brought from one location to another location (a destination location). Inter alia this can involve items to be sent. In particular the objects to be sorted in the sorting installation can be items sent by mail, such as consignments, parcels, small packages, letters or the like.

The bringing back of objects from the collection end station to the sorter by means of the transport facility does not necessarily have to be done solely by the transport facility. For example another facility can be arranged between the transport facility and the sorter, via which objects are transported automatically from the transport facility to the sorter. In other words the formulation that objects are brought back from the collection end station by the transport facility to the sorter includes the case in which objects are not brought back to the sorter directly by means of the transport facility, but to a facility arranged between the transport facility and the sorter, which automatically transports the objects onwards to the sorter.

In a preferred manner, each of the objects conveyed on the sorter is brought from the sorter either into one of the retrieval end stations or into the collection end station in the first distribution pass.

It is further preferred for the objects brought back to the sorter by the transport facility to be brought from the sorter into one of the retrieval end stations or into the collection end station in the second distribution pass in each case. Depending on the number of end stations needed for a desired fine distribution, the objects brought back to the sorter, which are distributed in the second distribution pass from the sorter to the retrieval end stations, can be distributed either to all of the retrieval end stations or just to a few retrieval end stations.

Expediently the retrieval end stations are assigned predetermined destination regions in the first distribution pass. The destination regions can for example involve a predetermined parcel handling/dispatch center or a predetermined delivery region in each case. In a preferred variant of the invention a few or all of the retrieval end stations are assigned in the second distribution pass predetermined destination regions different from those assigned to them in the first distribution pass.

Preferably a few or all of the objects brought back by means of the transport facility to the sorter are brought by the sorter into the retrieval end stations in the second distribution pass.

It is further advantageous for a few or all of the retrieval end stations to be unloaded before the objects brought back from the collection end station to the sorter are brought by the sorter into the retrieval end stations in the second distribution pass, in particular in order to avoid objects being brought in the second distribution pass into a retrieval end station in which there are still objects from the first distribution pass.

The respective retrieval end station can be unloaded manually for example. As an alternative the respective retrieval end station can be unloaded automatically.

In an advantageous embodiment variant of the invention, the objects transported away from the collection end station are brought back immediately by the transport facility to the sorter. In particular this enables avoiding having to carry out once again the process steps that are carried out before the respective object is brought to the sorter for the first time, such as for example a pre-sorting on a (pre)sorter upstream of the sorter.

In a preferred manner, sorting information of the object transported away from the collection end station is read by a read facility of the sorting installation before this is brought by the sorter into one of the end stations in the second distribution pass.

Sorting information of an object is to be understood as information on the basis of which the object can be assigned/allocated to one of the end stations of the sorting installation.

The sorting information of the respective object can in particular comprise a destination/recipient address of the object. Expediently the sorting information of the respective object is attached to the outside of the object. The sorting information of the respective object can be present in particular in encoded form, for example in the form of a barcode.

Preferably, the sorting information of the respective object transported away from the collection end station is read when the respective object is on the sorter. A read facility of the sorter that might be present can be used here for reading the sorting information for example. A separate read facility, which reads the sorting information of the respective object transported away from the collection end station while the object is located on the transport facility can be dispensed with in this case.

Expediently, the sorter is controlled by a control unit. It is further expedient for the read facility to send the sorting information read by it from the object being conveyed on the sorter to the control unit. In a preferred manner, the control unit controls the end station into which the sorter brings the respective object as a function of the respective sorting information.

There can further be provision for those objects that are being transported away by means of the transport facility from the collection end station initially to be transported away as a mass flow (also known as a bulk flow) from the collection end station and for the mass flow to be converted by a singulator (i.e. a separation facility) into a separated flow of objects.

In a mass flow of objects, the objects are not in any order as regards their alignment and are not at a uniform distance from one another. In a separated flow of objects on the other hand the objects are at least approximately at a uniform distance from one another and are also have an approximately uniform alignment. The separation (i.e. the conversion of the mass flow into a separated flow of objects) can in particular facilitate the reading of sorting information of the respective object and also the distribution of the objects to the individual end stations. Expediently the separation is done before the objects transported away from the collection end station reach the sorter once again.

Objects brought into the collection end station can be stored temporarily in a storage area of the collection end station. Preferably these objects are subsequently automatically conveyed to the transport facility for the second distribution pass by a conveyor unit of the collection end station. This enables a manual reloading onto the transport facility of objects stored in the storage area to be dispensed with.

Objects that are brought from the sorter into the collection end station in the second distribution pass can if necessary be transported away again automatically by the transport facility from the collection end station and automatically brought back to the sorter. Subsequently these objects can be brought by the sorter in each case into one of the end stations in a third distribution pass. Depending on the requirement for end stations for a desired fine distribution of the objects, this process can be repeated one or more further times if necessary.

As mentioned at the outset, the invention relates, inter alia, to a sorting installation for the sorting of objects. The inventive sorting installation comprise a number of retrieval end stations, a collection end station and also a sorter for conveying objects, which is configured to introduce objects conveyed on the sorter into one of the end stations in each case. Moreover the inventive sorting installation contains a transport facility for automatically transporting away objects from the collection end station and also for automatically bringing these objects back to the sorter, wherein objects are able to be brought from the collection end station by the transport facility to a section of the sorter from which these objects are able to be brought by the sorter into one of the end stations in each case.

Forms of embodiment, embodiment details and advantages described above in conjunction with the inventive method can also relate to the inventive sorting installation.

Expediently, the inventive sorting installation is suitable for carrying out the inventive method. The sorting installation described in conjunction with the inventive method can in particular involve the inventive sorting installation.

Inter alia, the sorting installation can be a component of a package handling or dispatch center. The end stations of the sorting installation can in particular involve so called local end stations (also called B end stations). All or a few of the end stations can be arranged in a row next to one another, in particular adjoining one another.

The collection end station can be embodied with the same design as one of the retrieval end stations. As an alternative the collection end station can be embodied differently from the retrieval end stations. In the latter case the collection end station can have a greater storage capacity for objects than the retrieval end stations for example. The retrieval end stations are preferably embodied with the same design as each other.

The end stations are advantageously arranged at least in part below the sorter. To put it another way, the end stations are advantageously arranged at least in part at a lower level than the sorter. This makes it possible in particular to transport objects under the influence of gravity from the sorter to the exit area of the respective collection end station.

In a preferred embodiment of the invention, the transport facility has a singulator for separation of objects.

Moreover, the sorter of the sorting installation can have a read facility for reading sorting information of an object. The read facility can comprise a device such as a barcode reader or another device of this type.

Preferably, the transport facility has an object entry section and an object exit section. The object entry section is advantageously arranged at least approximately at the same height as the exit area of the collection end station. This enables objects to slide from the collection end station onto the transport facility for example, without having to overcome large differences in height, so that damage to the objects can be avoided.

The object exit section of the transport facility can be arranged at a higher level than the object entry section. In this case the transport facility advantageously contains a vertically running conveyer with a conveyor drive. Such an embodiment of the transport facility makes it possible for example to bring back objects by means of the transport facility to the sorter if the sorter is arranged at a higher level than the exit area of the collection end station.

A vertically running conveyer in this case is a conveyer that is configured to bring an object from a first height level to a second height level that lies above the first height level. The vertically running conveyer of the transport facility can be embodied as a belt conveyor or as a roller conveyor for example.

In a preferred manner, the transport facility is configured to bring objects from the collection end station directly back to the sorter. This can be achieved by a positioning of the object exit section of the transport facility on the sorter.

The transport facility can further be configured to accept objects directly from the collection end station. This can be achieved by a positioning of the object entry section of the transport facility on the sorter.

The collection end station preferably has at least one storage area for accepting objects. In a preferred embodiment of the invention the storage area contains a base that can be raised and lowered. This makes it possible to set the storage capacity of the collection end station variably. The base that can be raised and lowered can be pivotably supported for example or be supported in a translationally height-adjustable manner.

A translationally height-adjustable support of the base is to be understood in the present example as a support in which the base can change its vertical position by means of a translation movement.

It is further advantageous for the base that can be raised and lowered to comprise a conveyor unit for conveying objects to the transport facility. This conveyor unit can be a conveyor equipped with a conveyor drive for example, such as for example a belt or roller conveyor. As an alternative the conveyor unit can be a gravitational conveyor, for example a roller track without a drive or a slide.

The collection end station can in particular have a number of storage areas of the type described previously, for example an entry-side storage area and an exit-side storage area.

Where necessary, the sorting installation can have a number of collection end stations. These can in particular be embodied with the same design as each other. To this end the transport facility can be configured to transport objects away from the respective collection end station automatically and also to bring them automatically to a section of the sorter from which these objects are able to be brought by the sorter to one of the end stations in each case.

The sorter of the sorting installation is preferably what is known as a main sorter. For example the sorter can be embodied as a tilt tray sorter or as a transverse belt sorter. In addition to the sorter previously mentioned, the sorting installation can have one or more further sorters. In particular the sorting installation may comprise a number of different types of sorter, such as for example one or more main sorters and also one or more pre-sorters.

The description of preferred embodiments of the invention given above contains additional features, which in some cases are reproduced grouped together into a number of features in the individual dependent claims. The features can however also be considered on their own and grouped together into sensible further combinations. In particular these features are able to be combined individually in each case and in any suitable combination with the inventive method and the inventive sorting installation. Method features can further also be seen as a characteristic of the corresponding facility unit.

Other features which are considered as characteristic for the invention are set forth in the appended claims.

Although the invention is illustrated and described herein as embodied in a method for the sorting of objects and a sorting installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a side view of a second exemplary embodiment of an inventive sorting installation.

DETAILED DESCRIPTION OF THE INVENTION

Figure 1:
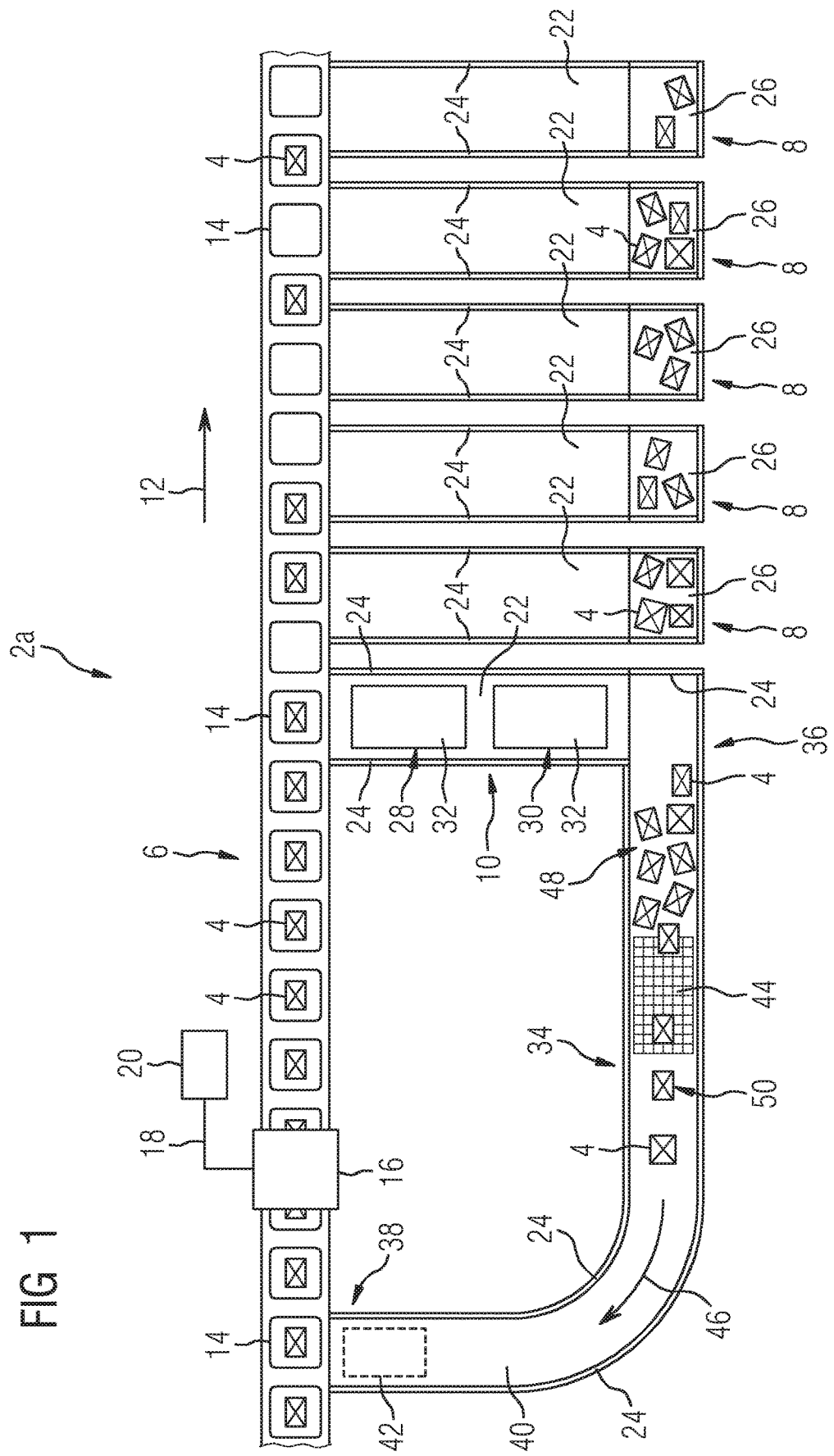
FIG. 1 is a diagrammatic, top plan view of a first exemplary embodiment of an inventive sorting installation.

Referring now to the figures of the drawings in detail and first, particularly to FIG. 1 thereof, there is shown a schematic of a part of a first sorting installation 2a for the sorting of objects 4, in particular parcels, in a view from above.

The sorting installation 2a contains a sorter 6, a number of retrieval end stations 8 as well as a collection end station 10. In FIG. 1 the end stations 8, 10 are depicted at a distance from one another for the purpose of improved clarity. Basically the end stations 8, 10 can be arranged without any distance between them, that is to say adjoining one another.

The sorter 6 is configured to transport the objects 4 to be sorted in a direction of conveyance 12 and to bring the objects 4 in each case into one of the end stations 8, 10. In the present exemplary embodiment the sorter 6 is embodied as a tilt tray sorter. The sorter 6 thus contains a plurality of tilt trays 14 for conveying the objects 4, wherein the tilt trays 14 also serve to bring the objects 4 in each case (by a tilting movement) into one of the end stations 8, 10. As an alternative the sorter 6 can be embodied as a transverse belt sorter for example.

The sorter 6 is furthermore equipped with a read facility 16. When the sorting installation 2a is operating, the sorter 6 conveys the objects 4 to be sorted in a direction of conveyance 12, wherein the objects 4 conveyed on the sorter 6 pass the read facility 16. The read facility 16 reads sorting information from each object 4 that passes the read facility 16, such as for example a destination address, and transfers the respective sorting information (for example via a connecting line 18) to a control unit 20 of the sorting installation 2a. Depending on the respective sorting information, the control unit 20 controls the end station 8, 10 into which the sorter 6 brings the respective object 4.

The end stations 8, 10 each have a chute 22, down which the objects 4 can slip or slide, as well as two side walls 24 delimiting the chute 22, which are intended to prevent the objects 4 being able to fall downwards from sides of the chute 22.

The retrieval end stations 8 also have a retrieval table 26, on which the objects 4 brought into the respective retrieval end station 8 can be stored. These objects 4 can be loaded by hand into roller containers from the retrieval tables 26 of the retrieval end stations 8 and transported away.

Figure 2:
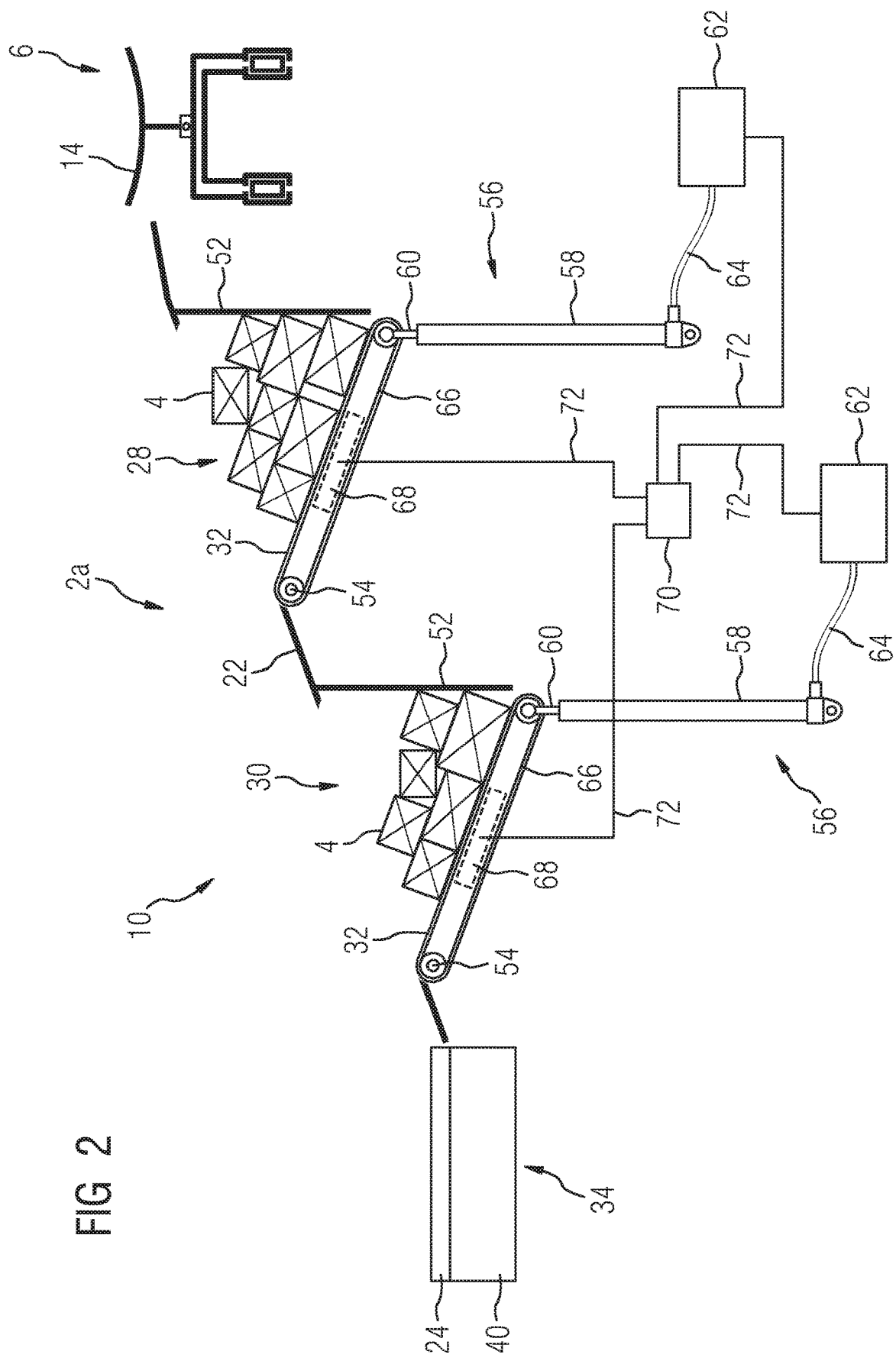
FIG. 2 is a side view of the sorting installation from FIG. 1 in a first state.
Figure 3:
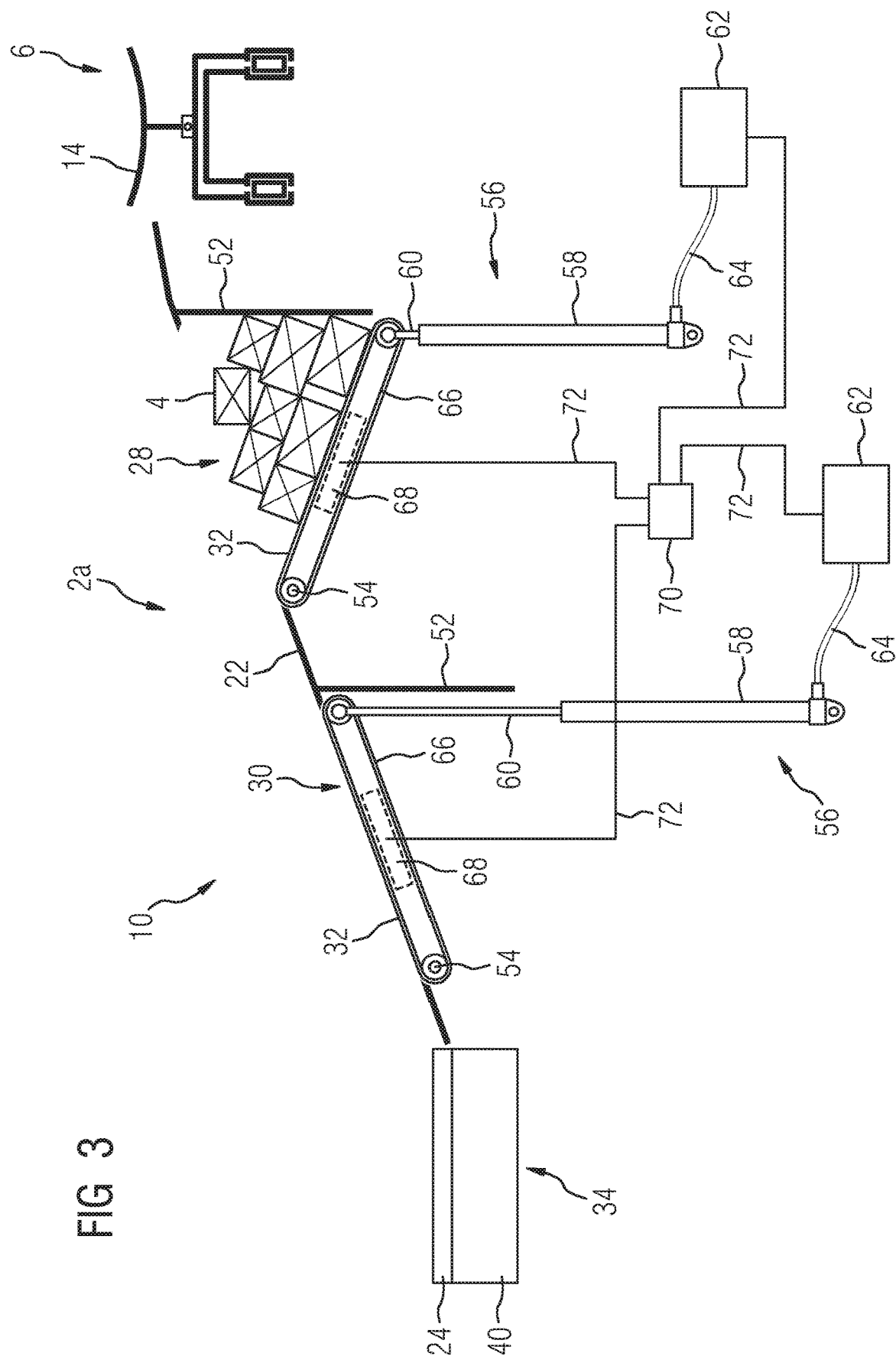
FIG. 3 is a side view of the sorting installation from FIG. 1 and FIG. 2 in a second state.

The collection end station 10 has an entry-side storage area 28 and also an exit-side storage area 30 for accepting objects 4, wherein the two storage areas 28, 30 each have a base 32 that can be raised or lowered (cf. FIG. 2 and FIG. 3). Basically the retrieval end stations 8 can also have one or more of such storage areas. Any such storage areas of the retrieval end stations 8 are not shown in FIG. 1 for the sake of improved clarity.

The sorting installation 2a further has a transport facility 34, which is configured to automatically transport objects 4 brought into the collection end station 10 away from the collection end station 10 and to automatically bring these objects 4 back to the sorter 6.

The transport facility 34 has an object entry section 36, which is arranged on the collection end station 10, and also an object exit section 38, which—related to the direction of conveyance 12 of the sorter 6—is arranged on a section of the sorter 6 arranged before the read facility 16 and is arranged at a higher level than the object entry section 36.

Moreover the transport facility 34 has a vertically running conveyor 40 with a conveyor drive 42, in particular an electric motor, as well as side walls 24 delimiting the conveyor 40. The conveyor 40 of the transport facility 34 can be embodied as a roller conveyor for example, wherein basically other embodiments of the conveyor 40 are also possible. Moreover the transport facility 34 has a singulator 44 for the separation of objects 4.

When the sorting installation 2a is operating the objects 4 being conveyed on the sorter 6 are brought by the sorter 6 into the end stations 8, 10 in a first distribution pass. During the first distribution pass the retrieval end stations 8 are assigned predetermined destination regions. Those objects 4 of which the destination address does not lie within one of these destination regions are brought into the collection end station 10. The other objects 4 are brought into the associated retrieval end station 8 in accordance with their destination addresses in each case.

The objects 4 brought into the collection end station 10 are stored temporarily in at least one of the two storage areas 28, 30 of the collection end station 10 while the retrieval end stations 8 are being unloaded.

For a second distribution pass, in which predetermined destination regions other than those assigned during the first distribution pass are assigned to the retrieval end stations 8, the objects 4 brought into the collection end station 10 are then brought back directly to the sorter 6 by the transport facility 34. Here the transport facility 34, at its object entry section 36, takes the objects 4 out of the collection end station 10 and conveys these objects 4 by its conveyor 40 in a direction of conveyance 46 to its object exit section 38, from where the transport facility 34 transfers these objects 4 to the sorter 6.

Those objects 4 that are transported by means of the transport facility 34 away from the collection end station 10 are initially transported away from the collection end station 10 as a mass flow 48. With the aid of a singulator 44 of the transport facility 34 the mass flow 48 is converted into a separated flow 50 of objects 4. In this way it is insured that at most one object 4 in each case gets onto the tilt trays 14 of the sorter 6.

The read facility 16 reads from each object 4 brought back to the sorter 6 its sorting information. Depending on the sorting information of the respective object 4 brought back to the sorter 6, the sorter 6 brings the respective object 4 into one of the end stations 8, 10 in the second distribution pass. Depending on the number of retrieval end stations 8 needed for the desired fine distribution of the objects 4, the objects 4 brought back to the sorter in the second distribution pass are distributed by the sorter 6 either just to the retrieval end stations 8 (that have become free in the meantime) or both to the retrieval end stations 8 and also to the collection end station 10.

Objects 4 that are brought into the collection end station 10 by the sorter 6 in the second distribution pass can if necessary be transported away automatically from the collection end station 10 and brought back to the sorter 6 for a third distribution pass by the transport facility 34. Depending on the need for end stations 8, 10 for the desired fine distribution of the objects 4, the sorting/distribution process described above can be repeated one or more further times where necessary.

FIG. 2 shows a schematic of the first sorting installation 2a in a view from the side. Depicted in FIG. 2 are the collection end station 10, the sorter 6 and also the transport facility 34 of the first sorting installation 2a. The side walls 24 of the collection end station 10 previously mentioned are not shown in FIG. 2 for the sake of improved clarity.

As mentioned previously, the collection end station 10 contains an entry-side storage area 28 as well as an exit-side storage area 30, which each have a base 32 that can be raised and lowered. Each of the two storage areas 28, 30 is delimited by a rear retaining wall 52.

In the present exemplary embodiment, the base 32 of the entry-side storage area 28 that can be raised and lowered as well as the base 32 of the exit-side storage area 30 that can be raised and lowered are each supported pivotably about a pivot axis 54, wherein the respective pivot axis 54 is at right angles to the plane of the drawing shown in FIG. 2.

For each of the two storage areas 28, 30, the collection end station 10 has separate pivot mechanisms 56 for pivoting the respective base 32 that can be raised and lowered. The respective pivot mechanism 56 contains a pivot bearing not shown in the figure, to which the respective base 32 that can be raised and lowered is fastened, as well as a pivotably supported lifting cylinder 58, on which the respective base 32 that can be raised and lowered is supported and which has a piston rod 60 that can be extended and retracted.

In the present example the lifting cylinder 58 of the respective pivot mechanism 56 is embodied as a fluid cylinder. This means that the position of the piston rod 60 of the respective lifting cylinder 58 is able to be controlled by a (control) fluid. To set the fluid pressure in its lifting cylinder 58 the respective pivot mechanism 56 has a fluid pump 62, which is connected by a fluid line 64 to the lifting cylinder 58 of the respective pivot mechanism 56.

The base 32 of the exit-side storage area 30 that can be raised and lowered and also the base 32 of the entry-side storage area 28 that can be raised and lowered are equipped with a conveyor unit 66 in each case. In the present example the respective conveyor unit 66 is embodied as a belt conveyor equipped with an electric conveyor drive 68. Basically other embodiments of the two conveyor units 66 are also possible.

The collection end station 10 further contains a control device 70 for controlling the fluid pumps 62 as well as for controlling the conveyor units 66. The control device 70 is preferably connected to the conveyor units 66 and also to the fluid pumps 62 via control lines 72. As an alternative there can be provision for the control device 70 to control the conveyor units 66 and/or the fluid pumps 62 via radio signals.

The collection end station 10 is depicted in FIG. 2 in a state in which the base 32 of exit-side storage area 30 that can be raised and lowered and also the base 32 of the entry-side storage area 28 that can be raised and lowered are each in a lowered position. Also there are a number of objects 4 located on the base 32 of exit-side storage area 30 in each case that can be raised and lowered and also the base 32 of the entry-side storage area 28 that can be raised and lowered. This means that the respective base 32 that can be raised or lowered is serving as storage for objects 4.

In order to empty the two storage areas 28, 30, first of all the conveyor unit 66 of the base 32 of the exit-side storage area 30 that can be raised or lowered is controlled by the control device 70 of the collection end station 10 in such a way that the objects 4 are conveyed from the exit-side storage area 30 by this conveyor unit 66 to the transport facility 34.

The base 32 of the exit-side storage area 30 that can be raised and lowered is further raised with the aid of the associated pivot mechanism 56 (thus pivoted upwards in the present example), in order to be able to convey the objects 4 to the transport facility 34 from the entry-side storage area 28 via the base 32 of the exit-side storage area 30 that can be raised or lowered without these objects 4 falling downwards from the chute 22 of the collection end station 10 (into the exit-side storage area 30). Here the control device 70 of the collection end station 10 controls the corresponding fluid pump 62 in such a way that the fluid pump 62 changes the fluid pressure in the corresponding lifting cylinder 58 so that its piston rod 60 is extended.

When the base 32 of the exit-side storage area 30 that can be raised and lowered is located in its highest position (cf. FIG. 3), the conveyor unit 66 of the base 32 of the entry-side storage area 28 that can be raised or lowered is controlled by the control device 70 of the collection end station 10 in such a way that the objects 4 are conveyed from the entry-side storage area 70 from this conveyor unit 66 to the transport facility 34.

FIG. 3 shows a schematic of the first sorting installation 2a in the same view as that shown in FIG. 2. However the sorting installation 2a, or to put in more precisely, its collection end station 10, is in a different state from its state in FIG. 2.

In FIG. 3, the exit-side storage area 30 of the collection end station 10 is emptied (i.e. there are no objects located in the exit-side storage area 30) and the base 32 of the exit-side storage area 30 that can be raised and lowered is located in its highest position. In this state, objects 4 can be conveyed from the entry-side storage area 28 via the base 32 of the exit-side storage area 30 that can be raised and lowered without these objects 4 falling downwards from the chute 22 of the collection end station 10 (into the exit-side storage area 30).

The description of the exemplary embodiment given below is primarily restricted to the differences from the previous exemplary embodiment, to which the reader is referred in relation to features and functions that are the same. The same elements and/or those that correspond to one another, where this serves a useful purpose, are identified with the same reference characters. Features of the previous exemplary embodiment are included in the exemplary embodiment below without them being described once again.

FIG. 4 shows a schematic of a part of a second sorting installation 2b for the sorting of objects 4, in a view from the side.

The sorter 6, the collection end station 10 and also the transport facility 34, which is configured for automatically transporting the objects 4 away from the collection end station 10 and for automatically bringing these objects 4 back to the sorter 6 of the second sorting installation 2b are depicted in FIG. 4. In addition to these elements the second sorting installation 2b contains a number of retrieval end stations not shown in FIG. 4.

The second sorting installation 2b essentially corresponds to the first sorting installation 2a (cf. FIG. 1 to FIG. 3). However the sorter 6 of the second sorting installation 2b is not embodied as a tilt tray sorter but as a transverse belt sorter. Instead of tilt trays the sorter 6 of the second sorting installation 2b has a number transverse belts 74 for bringing objects 4 into the end stations 8, 10, wherein only one of the transverse belts 74 is visible in FIG. 4. As an alternative an embodiment of the second sorter 6 as a tilt tray sorter is (also) possible for the second sorting installation 2b.

The collection end station 10 of the second sorting installation 2b further differs from the collection end station 10 of the first sorting installation 2a (cf. in particular FIG. 2 and FIG. 3) in that, with the collection end station 10 of the second sorting installation 2b, the base 32 of the exit-side storage area 30 that can be raised and lowered is not supported pivotably but is supported translationally height-adjustably.

For the exit-side storage area 30 the collection end station 10 of the second sorting installation 2b has a lifting mechanism 76 instead of a pivot mechanism, by means of which the base 32 of the exit-side storage area 30 that can be raised and lowered is able to be raised and lowered translationally. In FIG. 4 the base 32 of the exit-side storage area 30 that can be raised and lowered is in its highest position.

The lifting mechanism 76 for the exit-side storage area 30 contains a number of (not pivotably supported) lifting cylinders 58, which are able to be controlled by a (control) fluid, as well as the fluid pump 62 controlled by the control device 70 of the collection end station 10, which is connected via the fluid lines 64 to these lifting cylinders 58.

Basically it is possible, instead of the base 32 of the exit-side storage area 30 that can be raised or lowered or in addition to the base 32 of the exit-side storage area 30 that can be raised or lowered, (also) for the base 32 of the entry-side storage area 28 that can be raised and lowered to be supported translationally height-adjustably and for the collection end station 10 for the entry-side storage area 28 to have a lifting mechanism (instead of the pivot mechanism 56).

The bringing of objects 4 from sorter 6 into the collection end station 10 (as well as into the retrieval end stations not shown in the figure) of the second sorting installation 2b is done in the same way as it is in first sorting installation 2a. Also the transporting away of objects 4 from the collection end station 10 and the bringing back of these objects 4 to the sorter 6 by means of the transport facility 34 is done in the same way as it is in first sorting installation 2a.

Although the invention has been illustrated and described in greater detail by the preferred exemplary embodiment, the invention is not restricted by the examples disclosed and other variations can be derived herefrom without departing from the scope of protection of the invention.

The following is a summary list of reference numerals and the corresponding structure used in the above description of the invention:

2a Sorting system
2b Sorting system
4 Object
6 Sorter
8 Retrieval end station
10 Collection end station
12 Direction of conveyance
14 Tilt tray
16 Read facility
18 Connecting line
20 Control unit
22 Chute
24 Side wall
26 Retrieval table
28 Storage area
30 Storage area
32 Base
34 Transport facility
36 Object entry section
38 Object exit section
40 Conveyor
42 Conveyor drive
44 Singulator
46 Direction of conveyance
48 Mass flow
50 Separated flow
52 Rear retaining wall
54 Pivot axis
56 Pivot mechanism
58 Lifting cylinder
60 Piston rod
62 Fluid pump
64 Fluid line
66 Conveyor unit
68 Conveyor drive
70 Control device
72 Control device
74 Transverse belt
76 Lifting mechanism

The invention claimed is:

1. A method for sorting objects in a sorting installation, which comprises the steps of:
conveying the objects on a sorter of the sorting installation, wherein in a first distribution pass a few of the objects conveyed on the sorter are brought from the sorter into retrieval end stations of the sorting installation and other objects of the objects conveyed on the sorter are brought from the sorter into a collection end station of the sorting installation, the collection end station having at least one storage area for accepting the objects, the storage area having a base that can be raised and lowered; and
automatically transporting, by means of a transport facility of the sorting installation, the objects away from the collection end station and automatically brought back to the sorter, wherein the objects brought back by means of the transport facility from the collection end station to the sorter are respectively brought into one of the retrieval end stations by the sorter in a second distribution pass;
conveying the objects to the transport facility with a conveyor unit of the base that can be raised and lowered.

2. The method according to claim 1, wherein the retrieval end stations are assigned predetermined destination regions in the first distribution pass and a few or all of the retrieval end stations are assigned different predetermined destination regions than in the first distribution pass in the second distribution pass.

3. The method according to claim 1, wherein a few or all of the objects brought back by means of the transport facility to the sorter by the sorter in the second distribution pass are brought into the retrieval end stations.

4. The method according to claim 1, wherein a few or all of the retrieval end stations are unloaded before the objects brought back from the collection end station to the sorter are brought by the sorter into the retrieval end stations in the second distribution pass.

5. The method according to claim 1, wherein the objects transported away from the collection end station are brought back by the transport facility directly to the sorter.

6. The method according to claim 1, which further comprises reading sorting information of the objects transported away from the collection end station using a read facility of the sorting installation, before the objects are brought by the sorter into one of the end stations in the second distribution pass.

7. The method according to claim 6, wherein the sorting information of a respective one of the objects transported away from the collection end station is read when the respective object is located on the sorter.

8. The method according to claim 1, wherein the objects, which are transported away from the collection end station by means of the transport facility, are initially transported away as a mass flow from the collection end station and the mass flow is converted by means of a singulator into a separated flow of the objects.

9. The method according to claim 1, wherein the objects brought into the collection end station are stored temporarily in a storage area of the collection end station and subsequently automatically conveyed to the transport facility for the second distribution pass by the conveyor unit.

10. A sorting installation for sorting objects, the sorting installation comprising:
   end stations including a plurality of retrieval end stations and a collection end station;
   a sorter for conveying the objects and configured to respectively bring the objects conveyed on said sorter into one of said end stations; and
   a transport facility for automatically transporting the objects away from said collection end station as well as for automatically bringing the objects back to said sorter, wherein the objects are able to be respectively brought from said collection end station by means of said transport facility to a section of said sorter from which the objects are able to be brought by said sorter into one of said end stations, said transport facility having an object entry section and an object exit section, said object exit section being disposed at a higher level than that of said object entry section; and
   said transport facility having a vertically running conveyor with a conveyor drive.

11. The sorting installation according to claim 10, wherein said transport facility has a singulator for separation of the objects.

12. The sorting installation according to claim 10, wherein said sorter has a read facility for reading sorting information of an object.

13. The sorting installation according to claim 10, wherein said transport facility is configured to bring the objects from said collection end station directly back to said sorter.

14. A sorting installation for sorting objects, the sorting installation comprising:
   end stations including a plurality of retrieval end stations and a collection end station, said collection end station having at least one storage area for accepting the objects, said storage area having a base that can be raised and lowered;
   a sorter for conveying the objects and configured to respectively bring the objects conveyed on said sorter into one of said end stations; and
   a transport facility for automatically transporting the objects away from said collection end station as well as for automatically bringing the objects back to said sorter, wherein the objects are able to be respectively brought from said collection end station by means of said transport facility to a section of said sorter from which the objects are able to be brought by said sorter into one of said end stations;
   said base that can be raised and lowered having a conveyor unit for conveying the objects to said transport facility.

\* \* \* \* \*